United States Patent
Funayama (10) Patent No.: US 9,047,887 B2
(45) Date of Patent: Jun. 2, 2015

(54) MAGNETIC RECORDING HEAD AND DISK APPARATUS WITH THE SAME

(71) Applicant: Kabushiki Kaisha Toshiba, Minato-ku (JP)

(72) Inventor: Tomomi Funayama, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/022,411

(22) Filed: Sep. 10, 2013

(65) Prior Publication Data

US 2015/0015992 A1  Jan. 15, 2015

Related U.S. Application Data

(60) Provisional application No. 61/845,394, filed on Jul. 12, 2013.

(51) Int. Cl.
*G11B 5/127* (2006.01)
*G11B 5/23* (2006.01)

(52) U.S. Cl.
CPC .............. *G11B 5/23* (2013.01); *G11B 5/1278* (2013.01)

(58) Field of Classification Search
CPC ............. G11B 2005/0024; G11B 5/1278; G11B 5/314; G11B 5/3146; G11B 5/02
USPC ............... 360/125.3, 125.31, 125.71, 125.74
See application file for complete search history.

(56) References Cited

U.S. PATENT DOCUMENTS

| | | |
|---|---|---|
| 2008/0137224 A1* | 6/2008 | Gao et al. .................. 360/55 |
| 2008/0304176 A1 | 12/2008 | Takagishi et al. |
| 2009/0052095 A1* | 2/2009 | Yamada et al. ............ 360/324 |
| 2009/0080120 A1* | 3/2009 | Funayama et al. ......... 360/319 |
| 2010/0061014 A1 | 3/2010 | Das et al. |
| 2010/0073806 A1 | 3/2010 | Koui et al. |
| 2011/0038080 A1 | 2/2011 | Alex et al. |
| 2011/0242701 A1* | 10/2011 | Ohtake et al. ........... 360/99.08 |
| 2012/0275061 A1* | 11/2012 | Takagishi et al. ....... 360/123.05 |
| 2013/0050875 A1* | 2/2013 | Yamada et al. ........... 360/125.3 |

FOREIGN PATENT DOCUMENTS

JP  2009-099248  5/2009

* cited by examiner

*Primary Examiner* — Adam B Dravininkas
(74) *Attorney, Agent, or Firm* — Oblon, McClelland, Maier & Neustadt, L.L.P.

(57) ABSTRACT

According to one embodiment, a magnetic recording head includes a main pole, a write shield facing the main pole with a write gap interposed therebetween, a recording coil, and a high-frequency oscillator including an oscillation layer provided within the write gap between an end portion of the main pole and the write shield, and an intermediate layer and a spin-injection layer stacked on the oscillation layer. The oscillation layer, the intermediate layer and the spin-injection layer are stacked in a direction intersecting the gap length direction of the write gap, and at least one of the oscillation layer and the spin-injection layer is electrically connected to one of the main pole and the write shield.

4 Claims, 7 Drawing Sheets

MAGNETIC RECORDING HEAD AND DISK APPARATUS WITH THE SAME

CROSS-REFERENCE TO RELATED APPLICATIONS

This application claims the benefit of U.S. Provisional Application No. 61/845,394, filed Jul. 12, 2013, the entire contents of which are incorporated herein by reference.

FIELD

Embodiments described herein relate generally to a magnetic recording head for high-frequency assist recording for use in a disk apparatus, and to a disk apparatus with the magnetic recording head.

BACKGROUND

A magnetic recording apparatus as an example of a disk apparatus incorporates a magnetic disk in a case, a spindle motor which supports and rotates the magnetic disk, a magnetic head for reading/writing data from/to the magnetic disk, and a carriage assembly supporting the magnetic head so that the head can move relative to the magnetic disk. The head section of the magnetic head includes a magnetic recording head for writing and a reproducing head for reading.

To increase the recording density and capacity of a magnetic disk apparatus or reduce its size, magnetic heads for perpendicular magnetic recording have recently been proposed. In one such magnetic head, a recording head comprises a main pole configured to produce a perpendicular magnetic field, a write shield pole, and a coil. The write shield pole is located on the trailing side of the main pole with a write gap therebetween and configured to close a magnetic path that leads to a magnetic disk. The coil serves to pass magnetic flux through the main pole.

A magnetic recording head for high-frequency assist recording with a spin-torque oscillator provided between the main pole and the write shield (i.e., in the write gap) has also been proposed. The spin-torque oscillator is formed by stacking an oscillator layer, intermediate layer and spin injection layer, and is electrically connected to the main pole and the write shield.

In the magnetic recording head constructed as the above, the write gap length is determined from the total film thickness of the spin-torque oscillator. To enhance linear recording density, i.e., a recording resolution in the longitudinal direction of a track, it is necessary to narrow the write gap. However, in the above-mentioned structure, the write gap of the magnetic recording head cannot be set narrower than the total film thickness of the spin-torque oscillator, which makes it difficult to increase linear recording density.

DETAILED DESCRIPTION

Various embodiments will be described hereinafter with reference to the accompanying drawings. In general, according to one embodiment, a magnetic recording head comprising: a main pole configured to apply a recording magnetic field to a recording layer of a recording medium; a write shield facing the main pole with a write gap interposed therebetween; a recording coil configured to cause the main pole to generate a magnetic field; and a high-frequency oscillator comprising an oscillation layer provided within the write gap between an end portion of the main pole and the write shield, and an intermediate layer and a spin-injection layer stacked on the oscillation layer. The oscillation layer, the intermediate layer and the spin-injection layer are stacked in a direction intersecting a gap length direction of the write gap; and at least one of the oscillation layer and the spin-injection layer is electrically connected to one of the main pole and the write shield.

First Embodiment

Figure 1:
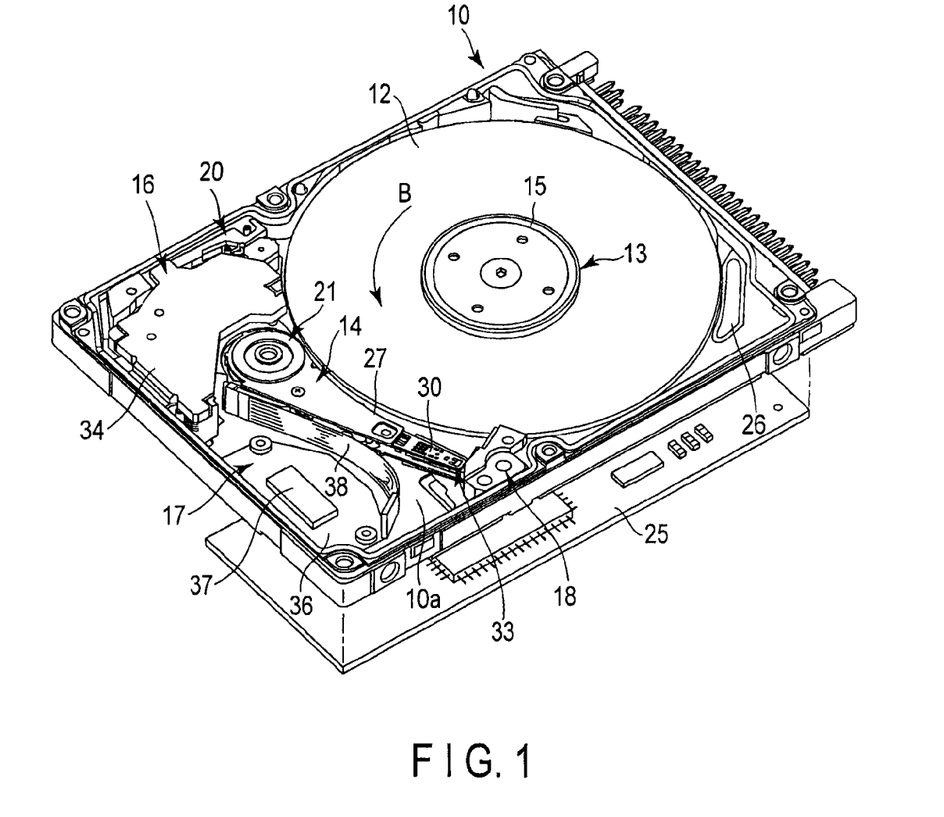
FIG. 1 is a perspective view showing a hard disk drive (hereinafter referred to as an HDD) according to a first embodiment.
Figure 2:
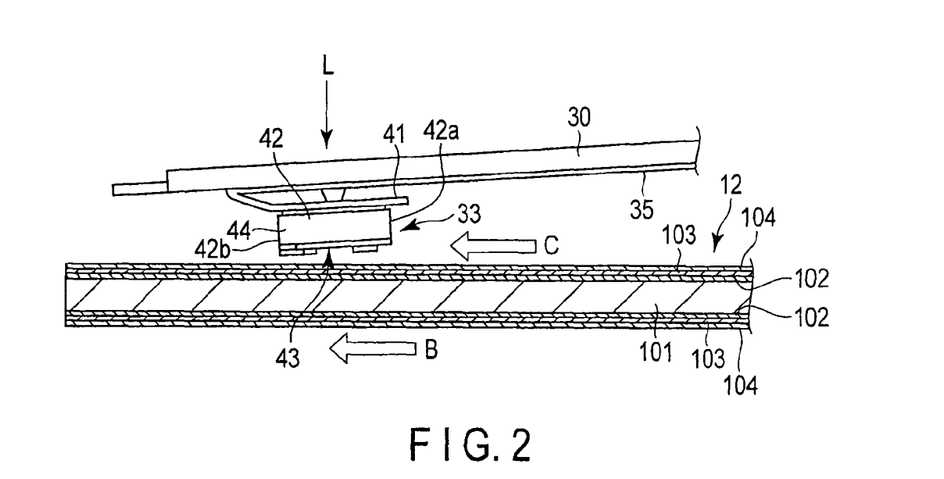
FIG. 2 is a side view showing a magnetic head and a suspension in the HDD.

FIG. 1 shows the internal configuration of an HDD according to a first embodiment with a top cover removed, and FIG. 2 shows a magnetic head in a flying state. As shown in FIG. 1, the HDD comprises a housing 10. This housing 10 comprises an open-topped rectangular box-shaped base 10*a* and a non-illustrated rectangular tabular top cover. The top cover is screwed to the base with screws to close the upper end opening of the base. As a result, the inside of the housing 10 is air-tightly maintained and can communicate with the outside for ventilation through a breather filter 26 alone.

A magnetic disk 12 as a recording medium and a mechanical section is provided on the base 10*a*. The mechanical section comprises a spindle motor 13 that supports and rotates the magnetic disk 12, a plurality of (e.g., two) magnetic heads 33 that record and reproduce data on and from the disk 12, a head actuator 14 that supports these magnetic heads 33 for movement relative to the surfaces of the magnetic disk 12, and a voice coil motor (which will be referred to as a VCM hereinafter) 16 that rotationally moves and positions the head actuator. Further, on the base 10*a* are provided a ramp loading mechanism 18 that holds the magnetic heads 33 in a position off the magnetic disk 12 when the magnetic heads 33 are moved to the outermost periphery of the magnetic disk 12, a latch mechanism 20 that holds the head actuator 14 in a retracted position if the HDD is jolted, for example, and a board unit 17 having electronic components, such as a conversion connector, mounted thereon.

A control circuit board 25 is attached to the outer surface of the base 10a by screws such that it faces the bottom of the base 10a. The control circuit board 25 controls the operations of the spindle motor 13, the VCM 16, and the magnetic heads 33 through the board unit 17.

In FIG. 1, a plurality of magnetic disks 12 may be coaxially fitted on the hub of the spindle motor 13, clamped by a clamp spring 15 screwed at the upper end of the hub, and thereby fixed to the hub. The magnetic disks 12 are rotated in a direction of an arrow B at a predetermined speed by the spindle motor 13 as a drive motor.

The head actuator 14 comprises a bearing portion 21 fixed on the bottom of the base 10a, and arms 27 extended from the bearing portion 21. These arms 27 are placed at predetermined intervals therebetween in parallel with the surfaces of the magnetic disk 12, and are extended in the same direction from the bearing portion 21. The head actuator 14 includes elastically deformable elongated plate-shaped suspensions 30. The suspensions 30 are each constituted of a leaf spring, and their respective proximal ends are fixed to ends of the arms 27 by spot welding or bonding such that the suspensions are extended therefrom. Alternatively, each suspension 30 may be formed integral with the corresponding arm 27 as one body. The magnetic head 33 is supported at the extended end of each suspension 30. The arms 27 and suspensions 30 constitute a head suspension, and the head suspension and the magnetic heads 33 constitute a head suspension assembly.

As shown in FIG. 2, each magnetic head 33 has a slider 42 formed into a substantially rectangular parallelepiped shape and a recording/reproducing head portion 44 provided at the outflow end (trailing end) of the slider. The magnetic heads 33 are fixed to gimbal springs 41 provided at the distal ends of the suspensions 30. A head load L heading for the surfaces of the magnetic disk 12 is applied to each magnetic head 33 by elasticity of the corresponding suspension 30. The two arms 27 are placed in parallel at a predetermined interval therebetween, and the suspensions 30 and the magnetic heads 33 attached to the arms 27 face the counterparts, with the magnetic disk 12 held therebetween.

Each magnetic head 33 is electrically connected to a later-described main flexible printed circuit board (hereinafter referred to as a main FPC) 38 through a relay flexible printed circuit board (hereinafter, a relay FPC) 35 fixed on the corresponding suspension 30 and arm 27.

As shown in FIG. 1, the board unit 17 has an FPC main body 36 formed of a flexible printed circuit board and a main FPC 38 extended from this FPC main body. The FPC main body 36 is fixed on the bottom surface of the base 10a. Electronic components including a conversion connector 37 and a head IC are mounted on the FPC main body 36. The extended end of the main FPC 38 is connected to the head actuator 14, and connected to the magnetic head 33 through each relay FPC 35.

The VCM 16 has a non-illustrated support frame extended from the bearing portion 21 in the opposite direction of the arm 27 and a non-illustrated voice coil supported by the support frame. Where the head actuator 14 is incorporated in the base 10a, the voice coil is placed between a pair of yokes 34 fixed on the base 10a, and the voice coil, the yokes, and magnets fixed to the yokes constitute the VCM 16.

When the magnetic disk 12 is rotated and the voice coil of the VCM 16 is activated, the head actuator 14 angularly moves to thereby position the magnetic head 33 on a desired track on the magnetic disk 12. At this time, the magnetic head 33 is radially moved between an inner peripheral portion and an outer peripheral portion of the magnetic disk 12.

Figure 3:
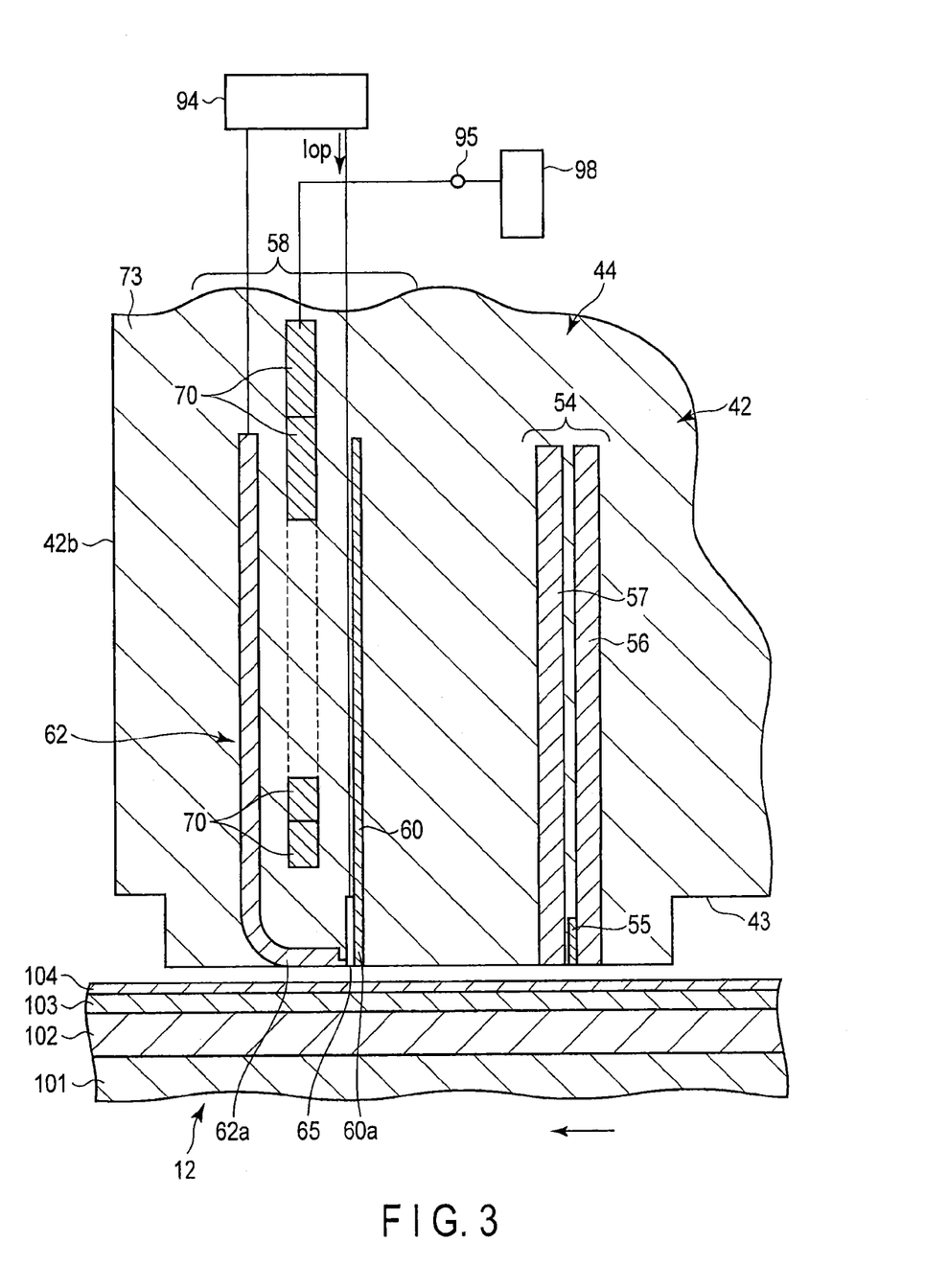
FIG. 3 is a cross-sectional view showing the head unit of the magnetic head in an enlarged manner.

The structure of the magnetic head 33 will now be described in detail. FIG. 3 is an enlarged cross-sectional view showing the head portion 44 of the magnetic head 33 and the magnetic disk 12.

As shown in FIGS. 1 to 3, the magnetic disk 12 includes a circular board 101 having a diameter of, for example, 2.5 inches (6.35 cm) and formed of a non-magnetic material. On each surface of the board 101, a soft magnetic layer 102, a magnetic recording layer 103 and a protective film 104 are stacked in this order. The soft magnetic layer 102 serves as a foundation layer and exhibits a soft magnetic property. The magnetic recording layer 103 on the soft magnetic layer vertically exhibits a magnetic anisotropic property to the disk surface.

As shown in FIGS. 2 and 3, the magnetic head 33 is formed as a float type head, and has a slider 42 formed into a substantially rectangular parallelepiped shape, and a head portion 44 formed at an end of the slider on the outflow (trailing) side. The slider 42 is formed of, e.g., a sintered compact (AlTiC) of alumina and a titanium carbide. The head portion 44 has a laminated structure of films.

The slider 42 has a rectangular disk facing surface (an air bearing surface (ABS)) 43 facing one surface of the magnetic disk 12. The slider 42 floats due to an air flow C generated between the disk surface and the disk facing surface 43 when the magnetic disk 12 rotates. The direction of the air flow C coincides with the rotation direction B of the magnetic disk 12. The slider 42 is arranged with respect to the surface of the magnetic disk 12 such that the length of the disk facing surface 43 is substantially aligned with the direction of the air flow C.

The slider 42 has a leading end 42a placed on the inflow side of the air flow C, and a trailing end 42b placed on the outflow side of the air flow C. A leading step, a trailing step, a side step, a negative pressure cavity, etc., which are not shown in the drawings, are formed at the disk facing surface 43 of the slider 42.

As shown in FIG. 3, the head portion 44 is formed as a separation type magnetic head, and comprises a reproducing head 54 and a recording head (magnetic recording head) 58 formed at the slider 42 in a thin-film process. The reproducing head 54 and the recording head 58 are covered with a protective insulating film 73, except for the portions to be exposed at the disk facing surface 43 of the slider 42. The protective insulating film 73 defines the outline of the head portion 44.

The reproducing head 54 comprises a magnetic film 55 exhibiting a magneto-resistance effect, and shield films 56 and 57 arranged on the trailing side and the leading side of this magnetic film to sandwich the magnetic film 55. The lower ends of the shield films 56 and 57 are exposed at the disk facing surface 43 of the slider 42.

Figure 4:
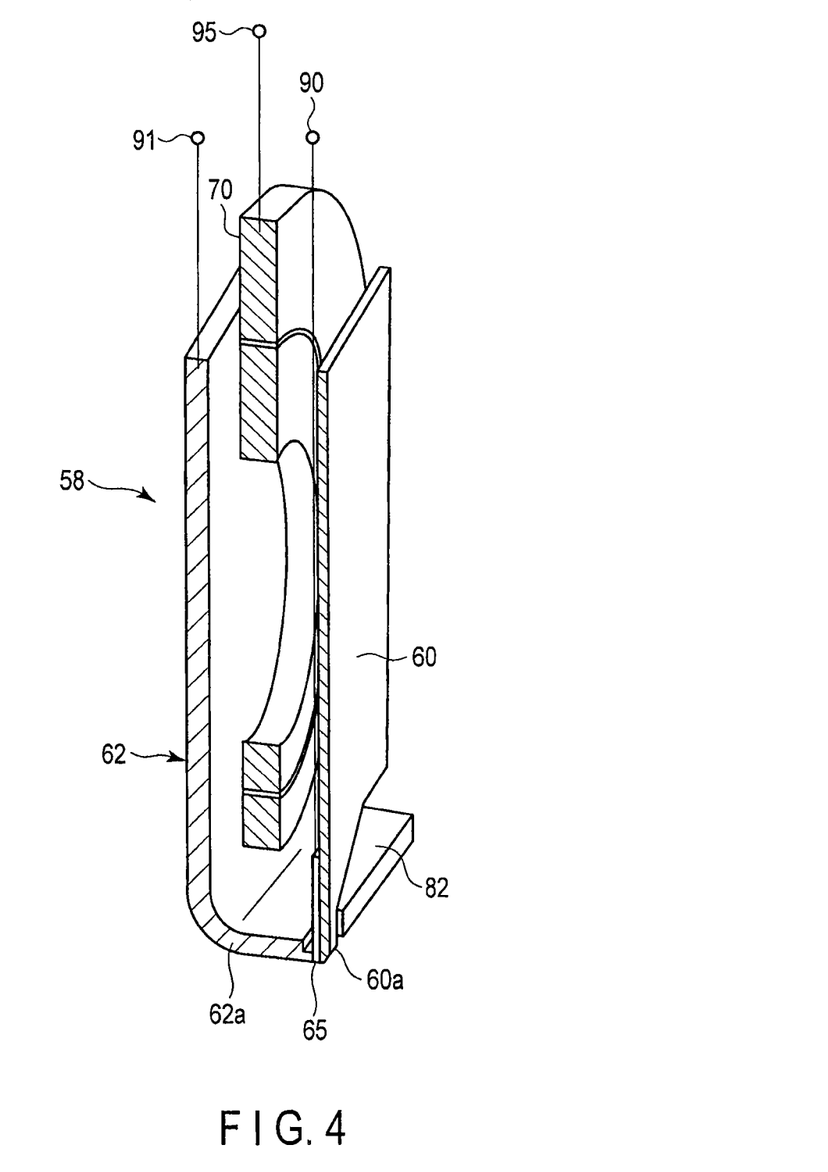
FIG. 4 is a schematic perspective view, partly in section taken along the track center, showing the magnetic recording head of the magnetic head.
Figure 5:
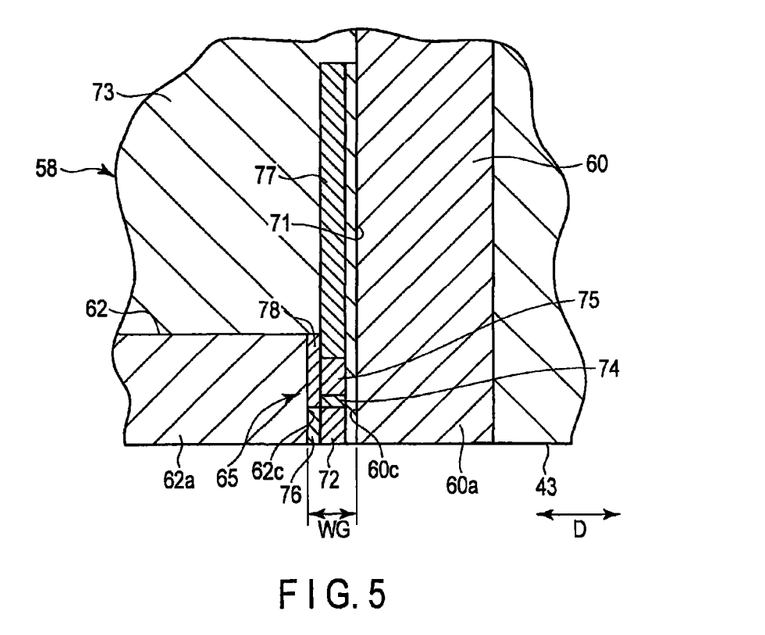
FIG. 5 is a cross-sectional view showing a main pole, a trailing shield and a high-frequency oscillator incorporated in the magnetic recording head.
Figure 6:
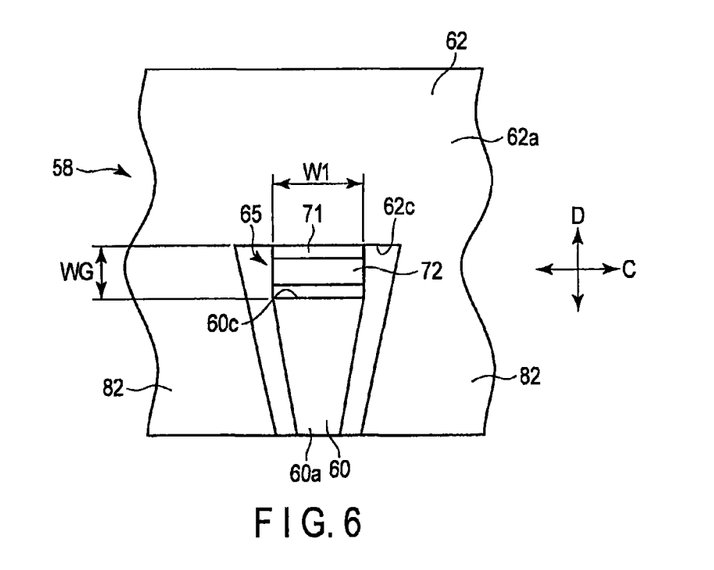
FIG. 6 is a plan view, viewed from an air bearing surface (ABS) side, showing the portion of the magnetic recording head near a write gap.

The recording head 58 is located on the trailing end 42b side of the slider 42 with respect to the reproducing head 54. FIG. 4 is a schematic perspective view, partly in section taken along the track center on the magnetic disk 12, showing the magnetic recording head 58. FIG. 5 is a cross-sectional view showing the main pole of the magnetic recording head, a trailing shield, and a high-frequency oscillator. FIG. 6 is a plan view, viewed from an air bearing surface (ABS) side, showing the portion of the magnetic recording head near a write gap WG.

As shown in FIGS. 3 and 4, the recording head 58 comprises a main pole 60 made of a soft magnetic material having a high saturation flux density, a trailing shield (write shield)

62 provided on the trailing side of the main pole 60, a recording coil 70 wound on a magnetic circuit including the main pole 60 and the trailing shield 62, and a high-frequency oscillator 65, such as a spin-torque oscillator. The trailing shield 62 is also made of a soft magnetic material having a high saturation flux density. The recording coil 70 is used to apply flux to the main pole 60 when a signal is written to the magnetic disk 12. The high-frequency oscillator 65 is provided between an end portion 60a of the main pole 60 and the trailing shield 62 at a position facing the ABS 43. To magnetize the magnetic recording layer 103 of the magnetic disk 12, the main pole 60 generates a recording magnetic field in the direction perpendicular to the surface of the magnetic disk 12. The trailing shield 62 is provided to efficiently close a magnetic path through the soft magnetic layer 102 immediately below the main pole 60.

As shown in FIGS. 3 to 6, the main pole 66 substantially perpendicularly extends with respect to the surface of the magnetic disk 12 and the disk facing surface 43. The end portion 60a of the main pole 60 on the magnetic disk 12 side is tapered toward the disk surface 43, and is formed into a narrow-width column with respect to the other members. The end surface of the main pole 60 is exposed at the disk facing surface 43 of the slider 42. The width W1 (in the cross-track direction C) of the end portion 60a of the main pole 60 across the track is substantially the same as the track width of the magnetic disk 12.

The trailing shield 62 is substantially L-shaped, and its end portion 62a is formed into an elongated rectangular shape. The end surface of the trailing shield 62 is exposed at the ABS 43 of the slider 42. The leading side end surface 62c of the end portion 62a extends along the track width of the magnetic disk 12. The leading side end surface 62c faces the trailing side end surface 60c of the main pole 60 in parallel, with the write gap WG (i.e., the gap length in the down-track direction D) defined therebetween.

In the first embodiment, the recording head 58 includes side shields 82 that are provided on the opposite sides of the main pole 60 along the track width, physically divided by the main pole 60, and connected to the trailing shield 62.

The recording coil 70 is provided, for example, between the main pole 60 and the trailing shield 62. A terminal 95 is connected to the recording coil 70, and is also connected to a power supply 98. The current supplied from the power supply 98 to the recording coil 70 is controlled by a controller incorporated in the HDD. When a signal is written to the magnetic disk 12, a predetermined current is supplied from the power supply 98 to the recording coil 70 to thereby apply flux to the main pole 60 and generate a magnetic field.

As shown in FIGS. 5 and 6, the spin-torque oscillator 65 is provided within the write gap WG between the end portion 60a of the main pole 60 and the leading side end surface 62c of the trailing shield 62. The main pole 60 is formed by plating an alloy containing Fe, Co, Ni, etc. The trailing side end surface 60c of the main pole 60 is flattened by chemical mechanical polishing (CMP), and is then covered with an insulating layer 71 made of, for example, alumina.

The spin-torque oscillator 65 comprises an oscillation layer 72, an intermediate layer 74 and a spin-injection layer 75. These layers are provided on the insulating layer 71 and aligned or stacked in a direction intersecting the gap length direction (down-track direction D) of the write gap WG, for example, in the direction perpendicular to the ABS 43. The oscillation layer 72 is formed of an alloy of Fe, Co, Ni, etc., or of a laminated film. The oscillation layer 72 has its lower end exposed at the disk facing surface 43. A first electrode layer 76 is formed between the oscillation layer 72 and the leading side end surface 62c of the trailing shield 62, and is electrically connected to the oscillation layer 72 and the trailing shield 62.

The intermediate layer 74 is made of, for example, Cu, and is stacked on the oscillation layer 72. The spin-injection layer 75 is formed of an alloy or laminated film of Co, Pt, etc., or of Fe, Co or Ni, and is stacked on the intermediate layer 74. Further, a second electrode layer 77 is formed on the spin-injection layer 75 and the insulating layer 71, and is electrically connected to the spin-injection layer 75. Thus, the oscillation layer 72, intermediate layer 74, spin-injection layer 75 and second electrode layer 77 are stacked in this order in a direction perpendicular to the write gap WG and arranged on the same plane intersecting the write gap WG. In the first embodiment, only the oscillation layer 72 included in the spin-torque oscillator 65 is exposed at the ABS 43.

Also, within the write gap WG, an insulating layer 78 is provided between the leading side end surface 62c of the trailing shield 62, and the intermediate layer 74, the spin-injection layer 75, the second electrode layer 77. In the first embodiment, the width, in the cross-track direction C, of each of the first and second electrode layers 76 and 77, the oscillation layer 72 and the spin-injection layer 75 is formed substantially equal to the width W1 of the write gap WG in the cross-track direction C. However, the width of each layer including the oscillation layer 72 may be wider or narrower than W1.

As shown in FIGS. 3 and 5, a current circuit is configured such that a power supply 94 is connected to the second electrode 77 and the trailing shield 62, and current can be passed in series from the power supply 94 through the second electrode 77, the spin-torque oscillator 65, the first electrode 76 and the trailing shield 62.

When current is supplied through the first and second electrode layers 76 and 77 to the spin-torque oscillator 65 including the oscillation layer 72, the intermediate layer 74 and the spin-injection layer 75, the oscillation layer 72 oscillates to generate a high-frequency magnetic field. To enhance high frequency assist effect when writing data to the magnetic disk (recording medium), it is desirable to apply a higher frequency magnetic field. However, to increase high-frequency magnetic field intensity, it is necessary to increase the magnetic film thickness of the oscillation layer 72, i.e., to increase the product of the degree of magnetization and the film thickness. It is known that there is an upper limit on the degree of magnetization. To increase the magnetic film thickness, it is necessary to increase the film thickness of the oscillation layer 72. However, in the structure wherein the oscillation layer, the intermediate layer and the spin-injection layer are arranged along the length of the write gap within the gap, if the film thickness of the oscillation layer is increased to increase high-frequency magnetic field intensity, the write gap length will inevitably increase. This makes it difficult to acquire sufficient linear recording density.

In contrast, in the present embodiment, the oscillation layer 72, the intermediate layer 74 and the spin-injection layer 75 of the spin-torque oscillator 65 are stacked in this order within the write gap WG in a direction intersecting the down-track direction D of the write gap WG. Therefore, even if the oscillation layer 72 is formed relatively thick, the write gap WG can be kept relatively narrow. Thus, even if the oscillation layer 72 is formed to have the same thickness as that in the prior art, the write gap WG can be formed narrow to thereby obtain sufficient linear recording density. Further, since the electrode lead connecting the second electrode layer 77 to the power supply 94 is provided, as shown in FIG. 3, it becomes unnecessary to realize insulation at the back gap between the main pole 60 and the trailing shield 62, which makes it easy to enhance magnetic field intensity or response without assists.

As shown in FIG. 6, the trailing shield 62 and the side shields 82 are formed integral as one body. Since thus, the oscillation layer 72 for generating a high-frequency magnetic field is formed at a position near the magnetic disk, the intensity of the high-frequency magnetic field exerting on the magnetic disk can be enhanced.

In the HDD constructed as the above, when the VCM 16 is driven, the head actuator 14 is rotated to position the magnetic head 33 on a desired track. Further, the magnetic head 33 floats due to the air flow C generated between the disk surface and the ABS 43 during rotation of the magnetic disk 12. When the HDD operates, the ABS 43 of the slider 42 faces the disk surface with a gap therebetween. As shown in FIG. 2, the magnetic head 33 floats in an inclined posture in which the recording head 58 of the head portion 44 is closest to the surface of the magnetic disk 12. In this state, the reproducing head 54 is used to read recorded information from the magnetic disk 12, and the recording head 58 is used to write information to the magnetic disk 12.

In writing information, as shown in FIG. 3, direct current is supplied from the power supply 94 to the second electrode layer 77, the spin-torque oscillator 65 and the trailing shield 62 to cause the oscillator 65 to generate a high-frequency magnetic field, thereby applying the high-frequency magnetic field to the magnetic recording layer 103 of the magnetic disk 12. Further, alternate current is supplied from the power supply 98 to the recording coil 70 to excite the main pole 60, which, in turn, applies a vertical recording magnetic field to the recording layer 103 of the magnetic disk 12 just below the pole. As a result, information is recorded on the magnetic recording layer 103 with a desired track width. By superposing a high-frequency magnetic field on the recording magnetic field, magnetic recording of high magnetic coercive force and high magnetic anisotropic energy can be performed.

As described above, according to the first embodiment, the write gap WG is made to be narrow, thus, there can be provided a magnetic recording head of high recording resolution and high linear recording density, and a magnetic disk apparatus with this head.

HDD magnetic recording heads according to other embodiments will hereinafter be described. In the other embodiments, the same elements as those of the first embodiment are denoted by corresponding reference numerals, and their detailed descriptions will be omitted. The elements different from those of the first embodiment will be mainly described in detail.

Second Embodiment

Figure 7:
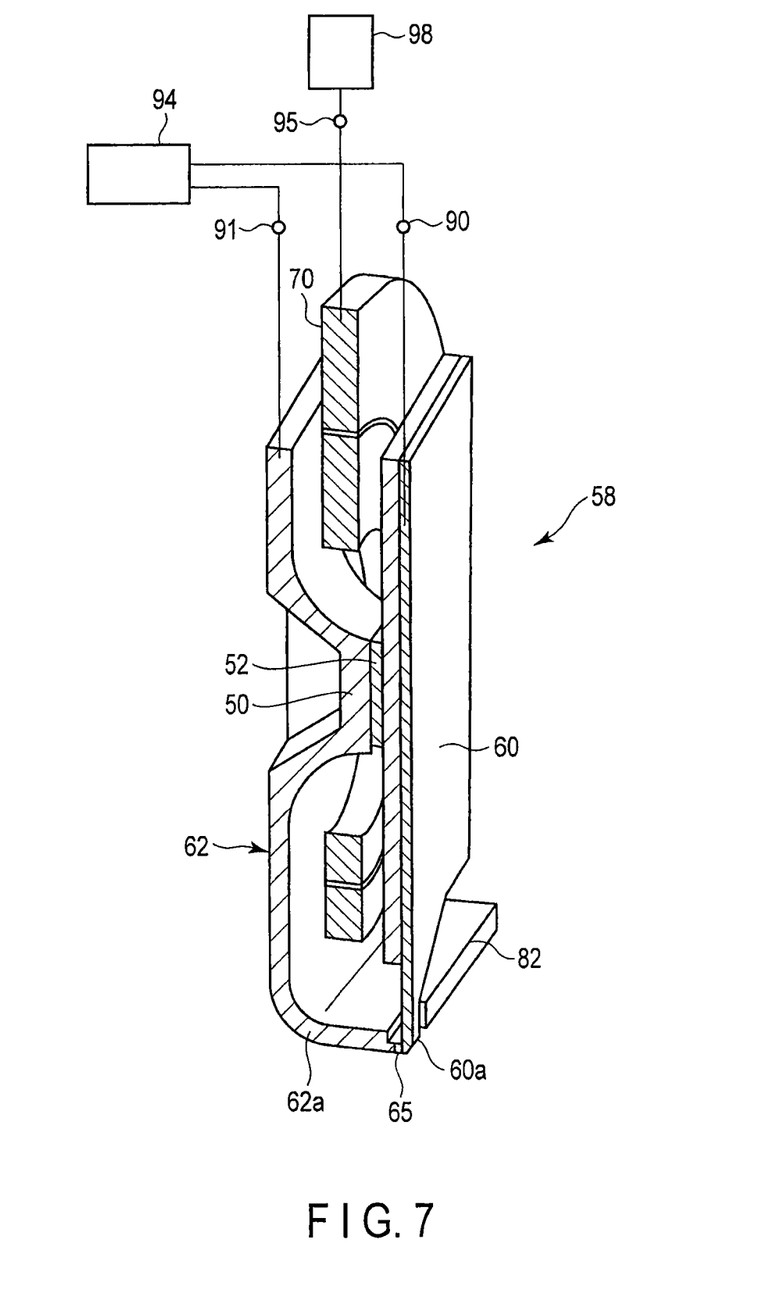
FIG. 7 is a schematic perspective view, partly in section taken along the track center, showing an HDD magnetic recording head according to a second embodiment.
Figure 8:
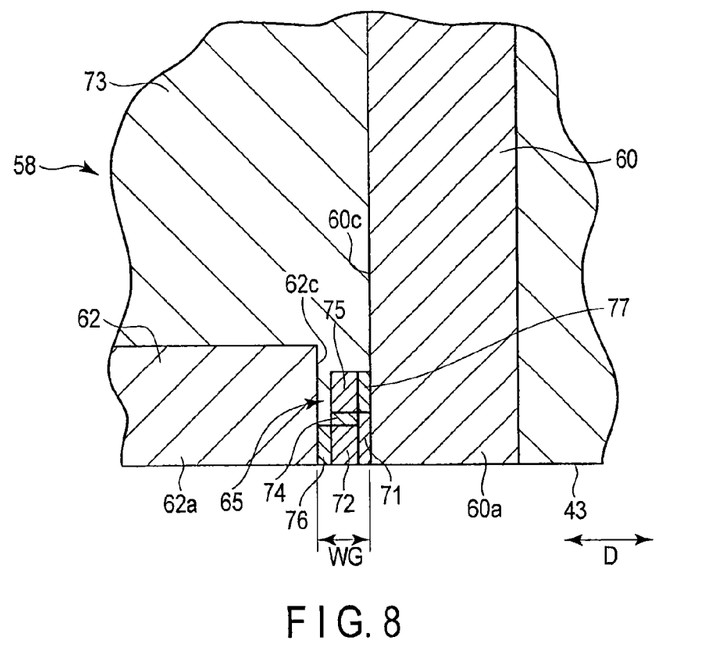
FIG. 8 is a cross-sectional view, taken along the track center, showing the magnetic recording head of the second embodiment.

FIG. 7 is a schematic perspective view, partly in section taken along the track center on the magnetic disk 12, showing an HDD magnetic recording head according to a second embodiment, and FIG. 8 is an enlarged cross-sectional view, showing a main pole, a trailing shield and a high-frequency oscillator incorporated in the recording head of the second embodiment.

In the second embodiment, the trailing shield 62 of the recording head 58 is substantially L-shaped, and comprises an end portion 62a facing the end portion of the main pole 60, and a connection portion 50 connected to the main pole 60, as is shown in FIG. 7. Specifically, the connection portion 50 is connected via a nonconductive material 52 to the upper portion of the main pole 60, i.e., an upper portion (back gap) apart from the disk facing surface 43. A recording coil 70 is wound around the connection portion 50 between, for example, the main pole 60 and the trailing shield 62. A terminal 95 is connected to the recording coil 70, and is also connected to a second power supply 98.

As shown in FIG. 8, the spin-torque oscillator 65 is provided within the write gap WG between the end portion 60a of the main pole 60 and the leading side end surface 62c of the trailing shield 62.

The spin-torque oscillator 65 comprises an oscillation layer 72, an intermediate layer 74 and a spin-injection layer 75. These layers are arranged side by side in a direction intersecting the gap length direction (down-track direction D) of the write gap WG, for example, in the direction perpendicular to the ABS 43. Namely, the layers are stacked. The oscillation layer 72 and the intermediate layer 74 are formed on an insulating layer 71 provided on the trailing side end surface 60c of the main pole 60. A first electrode layer 76 is formed between the oscillation layer 72 and the leading side end surface 62c of the trailing shield 62, and is electrically connected to the oscillation layer 72 and the trailing shield 62. The spin-injection layer 75 is formed on a second electrode layer 77 provided on the trailing side end surface 60c of the main pole 60. As a result, the spin-injection layer 75 and the main pole 60 are electrically connected to each other via the second electrode layer 77.

Thus, the oscillation layer 72, the intermediate layer 74 and the spin-injection layer 75 are stacked in a direction perpendicular to the down-track direction D of the write gap WG and arranged on the same plane intersecting the write gap WG. In the second embodiment, only the oscillation layer 72 among the elements of the spin-torque oscillator 65 is exposed at the ABS 43 of the slider.

In the second embodiment, the width, in the cross-track direction C, of each of the first and second electrode layers electrode layers 76 and 77, the oscillation layer 72, the intermediate layer 74 and the spin-injection layer 75 is formed substantially equal to the width W1 of the write gap WG in the cross-track direction C. However, the width of each layer including the oscillation layer 72 may be wider or narrower than W1.

As shown in FIGS. 5 and 7, a current circuit is configured such that a power supply 94 is connected to the main pole 60 and the trailing shield 62, and current can be passed in series from the power supply 94 through the main pole 60, the spin-torque oscillator 65 and the trailing shield 62. More specifically, current is passed in series from the power supply 94 through the main pole 60, the second electrode layer 77, the spin-torque oscillator 65, the first electrode layer 76 and the trailing shield 62.

When current is supplied through the first and second electrode layers 76 and 77 to the spin-torque oscillator 65 including the oscillation layer 72, the intermediate layer 74 and the spin-injection layer 75, the oscillation layer 72 oscillates to generate a high-frequency magnetic field. Since in the second embodiment, the second electrode layer 77 for power distribution is connected to the main pole 60, the first electrode layer 76 is connected to the trailing shield 62, and the trailing shield 62 and the main pole 60 are used as electrode leads, layout of a power feeding electrode is not necessary, which facilitates isolation from, for example, a coil.

In the second embodiment, the other structures of the magnetic recording head and the HDD are similar to those of the HDD of the first embodiment.

As described above, according to the second embodiment, the write gap WG is made narrow, thus, there can be provided a magnetic recording head of high recording resolution and high linear recording density, and a magnetic disk apparatus with this head.

Third Embodiment

Figure 9:
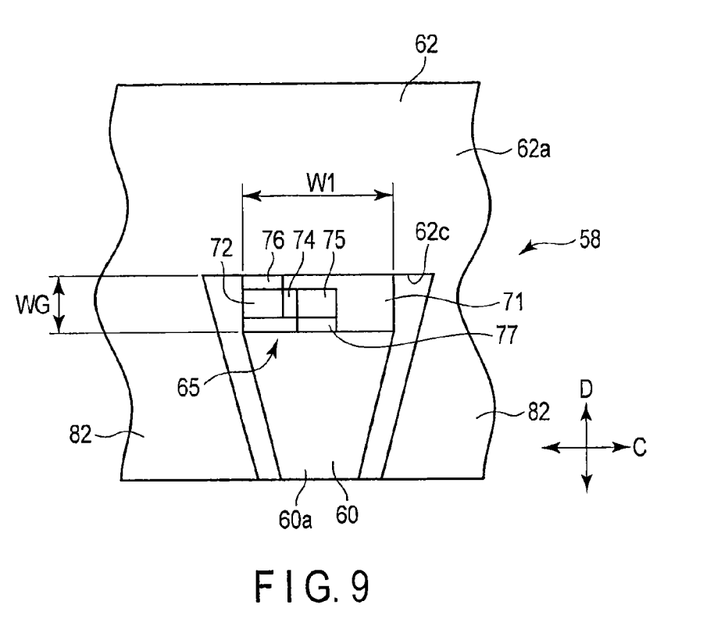
FIG. 9 is a plan view, viewed from the ABS side, showing an HDD magnetic recording head according to a third embodiment.
Figure 10:
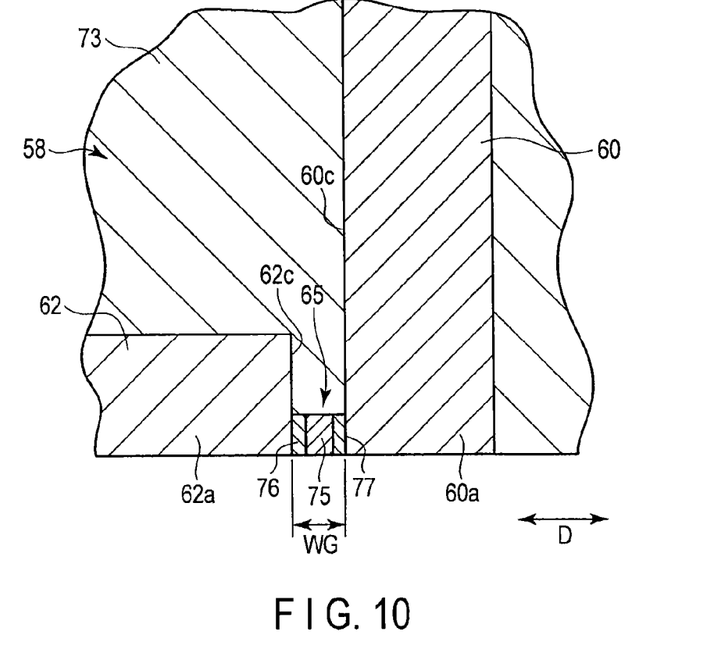
FIG. 10 is a schematic cross-sectional view, partly in section taken along the track center, showing the HDD magnetic recording head of the third embodiment.

FIG. 9 is a plan view, viewed from the ABS side, showing the end portion of an HDD magnetic recording head according to a third embodiment, and FIG. 10 is a schematic cross-sectional view showing the end portion of the HDD magnetic recording head.

An HDD recording head 58 according to the third embodiment is suitably used as a magnetic recording head of a single recording scheme. As shown in FIGS. 9 and 10, a spin-torque oscillator 65 is provided within a write gap WG between the end portion 60a of a main pole 60 and the leading side end surface 62c of a trailing shield 62.

The spin-torque oscillator 65 comprises an oscillation layer 72, an intermediate layer 74 and a spin-injection layer 75. These layers are arranged side by side in a direction intersecting the gap length direction (down-track direction D) of the write gap WG, for example, in the cross-track direction C of the write gap WG (parallel to an ABS 43). Namely, the layers are stacked. The oscillation layer 72 and the intermediate layer 74 are stacked on an insulating layer 71 provided on the trailing side end surface 60c of the main pole 60. A first electrode layer 76 is formed between the oscillation layer 72 and the leading side end surface 62c of the trailing shield 62, and is electrically connected to the oscillation layer 72 and the trailing shield 62. A second electrode layer 77 is formed on the trailing side end surface 60c of the main pole 60 at substantially the center in the cross-track direction C, and the spin-injection layer 75 is stacked on the second electrode layer 77. As a result, the spin-injection layer 75 and the main pole 60 are electrically connected to each other via the second electrode layer 77. An insulating layer 71 is formed between the intermediate layer 74, the spin-injection layer 75 and the trailing shield 62.

Thus, the oscillation layer 72, the intermediate layer 74 and the spin-injection layer 75 are stacked on the same plane intersecting the write gap WG in the cross-track direction C of the write gap WG perpendicular to the down-track direction D of the write gap WG. In the third embodiment, the oscillation layer 72, the intermediate layer 74 and the spin-injection layer 75 incorporated in the spin-torque oscillator 65 are exposed at the ABS 43 of a slider. The spin-injection layer 75 is positioned at substantially the center in the cross-track direction C. The oscillation layer 72 is provided close to the side shield 82 and away from the spin-injection layer 75, and on an end portion of the main pole 60 in the cross-track direction.

In the third embodiment, the other structures of the recording head 58 are similar to those of the recording head of the second embodiment.

In the single recording scheme, data is overwritten on the magnetic disk while gradually moving the recording head, thereby forming a thin track. In the third embodiment, satisfactory single recording is performed by shifting the magnetic head to leave the thin track portion of the magnetic disk corresponding to the oscillation layer 72, thereby applying a high-frequency magnetic field to the thin track portion. Further, in the third embodiment, since the spin-injection layer 75 is formed on the central portion of the main pole 60, magnetization inversion of the spin-injection layer can easily occur due to gap magnetic field.

Also, with the third embodiment, the write gap WG is made narrow, so that there can be provides a magnetic recording head of high recording resolution and high linear recording density, and a magnetic disk apparatus with this head.

Fourth Embodiment

Figure 11:
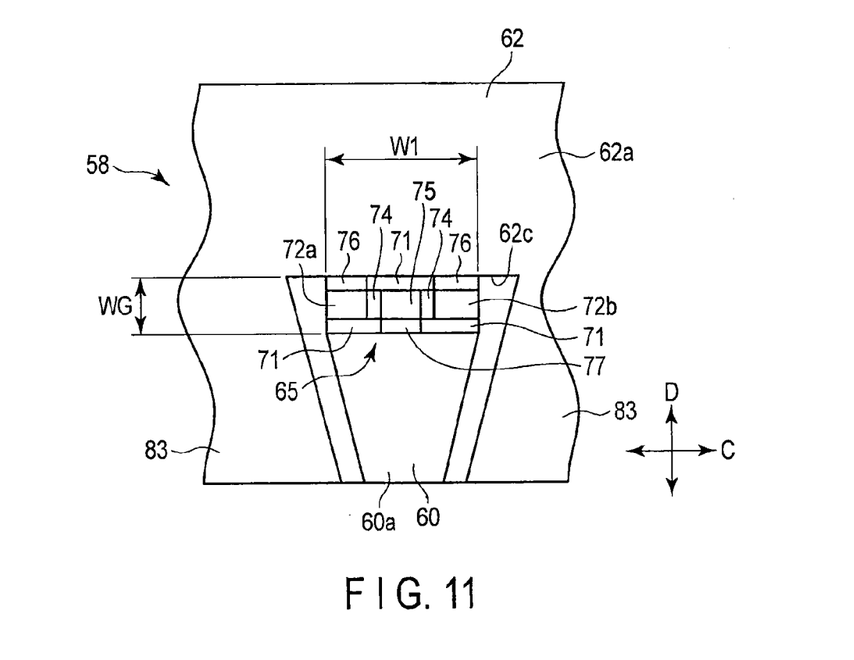
FIG. 11 is a plan view, viewed from the ABS side, showing an HDD magnetic recording head according to a fourth embodiment.

FIG. 11 is a plan view, viewed from the ABS side, showing a magnetic recording head according to a fourth embodiment.

Although in the third embodiment, the oscillation layer 72 of the spin-torque oscillator 65 is formed on one end portion of the main pole 60 in the cross-track direction, in the fourth embodiment, oscillation layers 72a and 72b are formed on opposite end portions of the main pole 60. The oscillation layers 72a and 72b are connected to one spin-injection layer 75 via respective intermediate layers 74. Namely, the oscillation layer 72a, one of the intermediate layers 74, the spin-injection layer 75, the other intermediate layer 74 and the oscillation layer 72b are stacked in this order on the same plane perpendicular to the write gap WG in the cross-track direction C of the write gap WG perpendicular to the down-track direction D of the write gap WG.

In the fourth embodiment constructed as the above, either of the oscillation layers may be used to perform single recording. This enables the two oscillation layers 72a and 72b to be used for, for example, the inner and outer peripheral portions of the magnetic recording medium, respectively.

With the fourth embodiment, the write gap WG can be made narrow, so that there can be provided a magnetic recording head of high recording resolution and high linear recording density, and a magnetic disk apparatus with this head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For instance, the material, shape, size, etc. of each element included in the head portion can be varied if need arises. Further, although in the embodiments, a single magnetic disk and a single magnetic head are employed, a plurality of magnetic disks and a plurality of magnetic heads can be used if need arises, and various sizes of magnetic disks can be used.

What is claimed is:
1. A magnetic recording head comprising:
a medium facing surface;
a main pole configured to apply a recording magnetic field to a recording layer of a recording medium;
a write shield facing the main pole with a write gap interposed therebetween;
a recording coil configured to cause the main pole to generate a magnetic field; and
a high-frequency oscillator comprising an oscillation layer provided within the write gap between an end portion of the main pole and the write shield, and an intermediate layer and a spin-injection layer stacked on the oscillation layer,
wherein the oscillation layer, the intermediate layer and the spin-injection layer are stacked in a direction intersecting a gap length direction of the write gap;
at least one of the oscillation layer and the spin-injection layer is electrically connected to one of the main pole and the write shield;

the intermediate layer and the spin-injection layer of the high-frequency oscillator are arranged side by side on a single plane that intersects the gap length direction of the write gap and is perpendicular to the medium facing surface; and only the oscillation layer in the high-frequency oscillator is exposed at the medium facing surface within the write gap.

2. The magnetic recording head of claim 1, which further comprises a first electrode layer provided between the oscillation layer and the write shield, and a second electrode layer connected to the spin-injection layer.

3. The magnetic recording head of claim 2, wherein the second electrode layer is stacked on the spin-injection layer in a direction intersecting the gap length direction of the write gap; and an insulating layer is provided between the main pole, and the oscillation layer, the intermediate layer, the spin-injection layer and the second electrode layer.

4. A disk apparatus comprising:

a recording medium comprising a magnetic recording layer;

a driving section configured to rotate the recording medium; and the magnetic recording head of claim 1 and configured to perform information processing on the recording medium.

\* \* \* \* \*